(12) United States Patent
Steil et al.

(10) Patent No.: US 6,649,112 B2
(45) Date of Patent: Nov. 18, 2003

(54) THERMAL EXPANSION COMPENSATION SUPPORT

(75) Inventors: Frederick G. Steil, Lake Orion, MI (US); Rui Novo, Lake Orion, MI (US); Frank J. Eigler, Ontario (CA)

(73) Assignee: D-M-E Company, Madison Heights, MI (US)

( * ) Notice: Subject to any disclaimer, the term of this patent is extended or adjusted under 35 U.S.C. 154(b) by 0 days.

(21) Appl. No.: 10/093,622

(22) Filed: Mar. 8, 2002

(65) Prior Publication Data

US 2002/0089090 A1 Jul. 11, 2002

Related U.S. Application Data

(62) Division of application No. 09/595,264, filed on Jun. 15, 2000, now Pat. No. 6,368,542.

(51) Int. Cl.$^7$ .......................... B29C 45/17; B29C 45/72
(52) U.S. Cl. ................... 264/328.14; 425/542; 425/547
(58) Field of Search .................... 264/328.1, 328.14, 264/328.15, 328.16; 425/542, 547, 549, 567

(56) References Cited

U.S. PATENT DOCUMENTS 6,203,305 B1 * 3/2001 Hofstetter et al. .......... 425/130

FOREIGN PATENT DOCUMENTS

WO          97/47458       * 12/1997

* cited by examiner

Primary Examiner—Jill L. Heitbrink
(74) Attorney, Agent, or Firm—Stephen H. Friskney

(57) ABSTRACT

A thermal expansion compensation support and method are used in a hot runner injection mold for maintaining liquid-tight relationships between parts that define a flow passageway. The support includes an annular housing having an annular recess that receives a spring, such as a Belleville washer, and a cover that overlies the annular recess in the housing. The housing and the cover are spring biased from each other to maintain a pressure force on the surfaces that are in contact with the outer faces of each of the cover and of the annular housing. The support imparts a holding force on the several parts of the machine that define the molding material flow passageway to prevent leakage. The method involves holding the parts together at a first holding force level for an initial portion of a warm-up temperature range and holding the parts together at a second holding force level for the remainder of the temperature range.

1 Claim, 2 Drawing Sheets

THERMAL EXPANSION COMPENSATION SUPPORT

CROSS REFERENCE TO RELATED APPLICATION

This application is a division of application Ser. No. 09/595,264 filed Jun. 15, 2000 now U.S. Pat. No. 6,368,542.

BACKGROUND OF THE INVENTION

1. Field of the Invention

The present invention relates to hot runner injection molding systems, and more particularly to a thermal expansion compensation support for a manifold used in a hot runner injection molding system.

2. Description of the Related Art

In hot runner injection molding systems a heated manifold is provided to convey molten plastic molding material from a source, such as a plastication barrel, to a plurality of injection nozzles. The nozzles are in fluid communication with respective mold cavities that define the shapes of parts to be molded. The manifold is heated to maintain the molten plastic material at a desired elevated temperature so that the material does not cool excessively as it flows from the plastication barrel to the mold cavities. The heat is typically provided by electrical heating elements within the manifold, or by circulating heated fluids through passageways within the manifold. The added heat maintains the molding material in a fluid state so it can readily be conveyed and completely fill the respective mold cavities to provide fully formed molded parts. Although the manifold is heated, the adjacent structural elements of the injection molding machine, which generally include a clamp plate and an injection nozzle retainer plate, are not heated and may actually be cooled by adjacent mold elements.

The hot runner manifold is generally spaced from the adjacent structural elements of the machine by spacers or supports, which are often disc-shaped or annular metallic members that serve to support the hot runner manifold within the mold assembly and space the manifold from the adjacent mold elements. The molding material is conveyed to the hot runner manifold, and then conveyed through the manifold to the respective injection nozzles. When starting such an injection molding machine from a "cold" (start-up) condition, the hot runner manifold is initially spaced from the respective adjacent machine structural elements at a predetermined distance. This spacing distance diminishes when the manifold expands as its temperature increases during the course of the operation of the injection molding machine. However, the adjacent structural elements, which are not directly heated, are at a lower temperature and therefore expand to a lesser degree.

As the molten molding material is conveyed from the plastication barrel to the hot runner manifold and from the manifold to the respective mold cavities, it passes through flow passageways that must remain aligned with each other to prevent leakage of the fluent molding material. Thus, it is essential that the molding material flow passageways within the respective adjoining elements of the machine be properly aligned throughout the machine warm-up process and subsequent operation, even though the parts expand at different rates and may ultimately have different operating temperatures.

In the past, various structural arrangements have been proposed in an effort to ensure that the respective parts of a hot runner injection molding machine are properly aligned and are arranged in leak-tight relationship. For example, in U.S. Pat. No. 4,588,367, entitled "Hot Runner Manifold For Injection Molding Machine", which issued on May 13, 1986, to Schad, the injection nozzle is retained in sealing engagement with a hot runner manifold block by means of a pair of Belleville washers. These springs are positioned to maintain engagement between the injection nozzles and the manifold block from initial start-up, through warm-up, to normal operating temperature. However, if the springs were to fail either before or during the time the machine is at normal operating temperature, the failure of the springs would allow the flow passageway between the injection nozzle and the manifold block to open. The parts would separate as a result of removing the spring force, thereby allowing the molten molding material to leak from the open flow passageway into the space between the manifold block and the mold plate, possibly interfering with the molding process by not supplying sufficient material to form the part properly.

Another arrangement for maintaining contact between a manifold block and a nozzle to avoid molding material leakage involves the use of a somewhat flexible spacer. Such an arrangement is disclosed in U.S. Pat. No. 5,125,827, entitled "Injection Molding Apparatus Having An Insulative And Resilient Spacer Member", which issued on Jun. 30, 1992, to Gellert. That patent discloses the use of an annular metallic spacer that is positioned between a hot runner manifold and the clamp plate that contacts the plastication barrel. The spacer is defined by a plurality of peripherally interconnected, V-shaped concentric rings that allow the spacer to deflect during the expansion of the manifold block relative to the clamp plate during warm-up to maintain the parts that define the material flow passageway in contact with each other. However, the structure of the spacer and the elasticity of the metallic material from which it is formed limits the degree of deflection that the spacer can undergo, and therefore full sealing contact of the injection nozzle and the manifold block throughout the range from cold start-up to full operating temperature cannot be achieved.

SUMMARY OF THE INVENTION

It is an object of the present invention to overcome the deficiencies of the spacer configurations in the prior art arrangements. It is another object of the present invention to provide a thermal expansion compensation support that is effective to maintain the parts that define the material flow passageway in continuous contact throughout the range of operation of a hot runner injection molding machine, from cold start-up through normal operating temperature, without allowing leakage of molding material from between the adjoining mold elements within which the molten material flow channel is provided.

Briefly stated, in accordance with one aspect of the present invention, a thermal expansion compensation support is provided in a hot runner mold assembly. The support includes a housing having a recess that defines an opening in the housing. A spring is positioned within the housing recess and extends outwardly of the housing opening. A cover overlies the opening and is in surface contact with the spring. A connector extends between the housing and the cover for holding the cover against the spring, thereby compressing the spring to apply a "preload" to the support, while leaving a defined gap between the housing opening and the cover.

In accordance with another aspect of the present invention, a method is provided for liquid-tight interconnections between the several members of the injection mold construction in which the molding material flow passageway is contained. The method includes holding the members together at a first holding force level for a first portion of the predetermined temperature range, and holding the members together at a second force level for a second portion of the predetermined temperature range.

DESCRIPTION OF THE PREFERRED EMBODIMENTS

Figure 1:
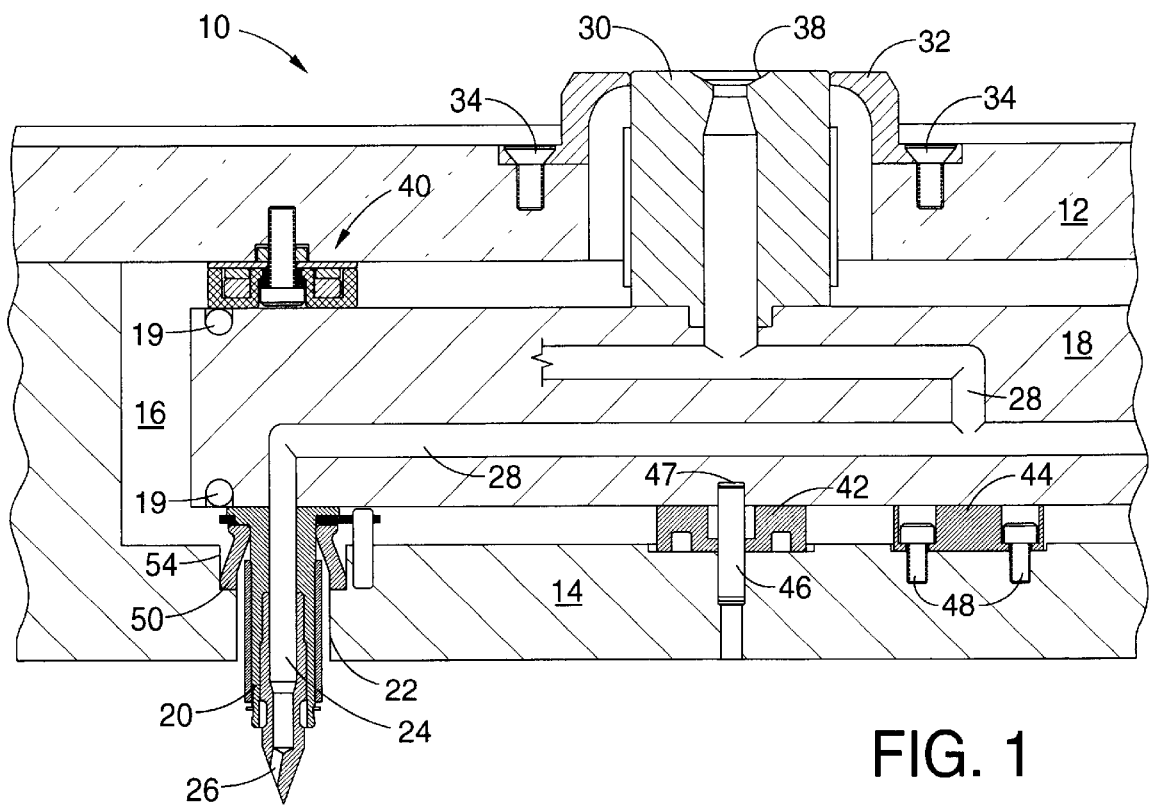
FIG. 1 is a fragmentary cross-sectional view showing a hot runner manifold block and adjacent mold elements for use in an injection molding machine.

Referring now to the drawings, and particularly to FIG. 1 thereof, there is shown a portion of the molding material flow passageway of a hot runner injection mold 10. The mold 10 includes a top clamp plate 12 and a nozzle retainer plate 14 positioned adjacent the clamp plate 12. The nozzle retainer plate 14 has a U-shaped cross section that defines a recess 16 adjacent a face of the clamp plate 12 for receiving a hot runner manifold block 18 that includes heating elements 19, preferably in the form of electrical resistance heaters.

Positioned between the manifold block 18 and nozzle retainer plate 14 is an injection nozzle body 20 that is received in an appropriately sized bore 22 formed in the retainer plate 14. The nozzle body 20 includes a central passageway 24 that terminates in a flow outlet 26 that is adapted to be in fluid communication with a gate to a mold cavity (not shown), as is generally known in the art. The nozzle passageway 24 communicates with a material flow channel 28 provided in the manifold block 18. A manifold extension 30 passes through the top clamp plate 12 and is retained in position by a locating ring 32 that is connected with the clamp plate 12 by means of cap screws 34. The manifold extension 30 includes a central passageway 36 that communicates with the material flow channel 28 in the manifold block 18. At its outermost end, the central passageway 36 terminates in a seat 38 that is adapted to engage with an outlet of an injection unit barrel (not shown) that provides a source of molten molding material.

As shown in FIG. 1, the hot runner manifold block 18 is spaced from each of the top clamp plate 12 and nozzle retainer plate 14 by means of supports 40, 42, and 44 that are positioned between and are in contact with the opposed surfaces of the respective parts. The supports 42 and 44 shown beneath the manifold block 18 in FIG. 1 are conventional, known support structures, generally cylindrical or disk-like in configuration. The support 42 is retained in position by means of a dowel pin 46 that extends into the nozzle retainer plate 14 and that also serves to orient properly the nozzle retainer plate 14 and manifold block 18 by engaging with a mating hole 47 provided in the manifold block 18. The support 44 is attached to the nozzle retainer plate 14 by screws 48.

The injection nozzle body 20 is in contact with the manifold block 18 and includes an injection nozzle support collar 50 that extends between an outwardly-extending flange 52 on the nozzle body 20 and a counterbore 54 provided in the nozzle retainer plate 14.

On the face of the manifold block 18 opposite from the conventional supports 42 and 44 is a manifold support 40 to compensate for thermal expansion in accordance with the present invention. Support 40 extends between and is in contact with the opposed faces of each of the top clamp plate 12 and hot runner manifold block 18.

As will be appreciated by those skilled in the art, the molten molding material passes into the central passageway 36 provided in the manifold extension 30, on into the material flow channel 28 in the manifold block 18, through the respective injection nozzle bodies 20 (only one of which is shown in FIG. 1), and finally into the respective mold cavities (not shown). To maintain contact between the manifold block 18 and injection nozzle body 20, thereby preventing leakage of the fluent molding material, the support 40 preferably includes a spring arrangement whereby a continuous force is maintained on the manifold block 18 so that the manifold block 18 and injection nozzle body 20 do not separate.

Figure 2:
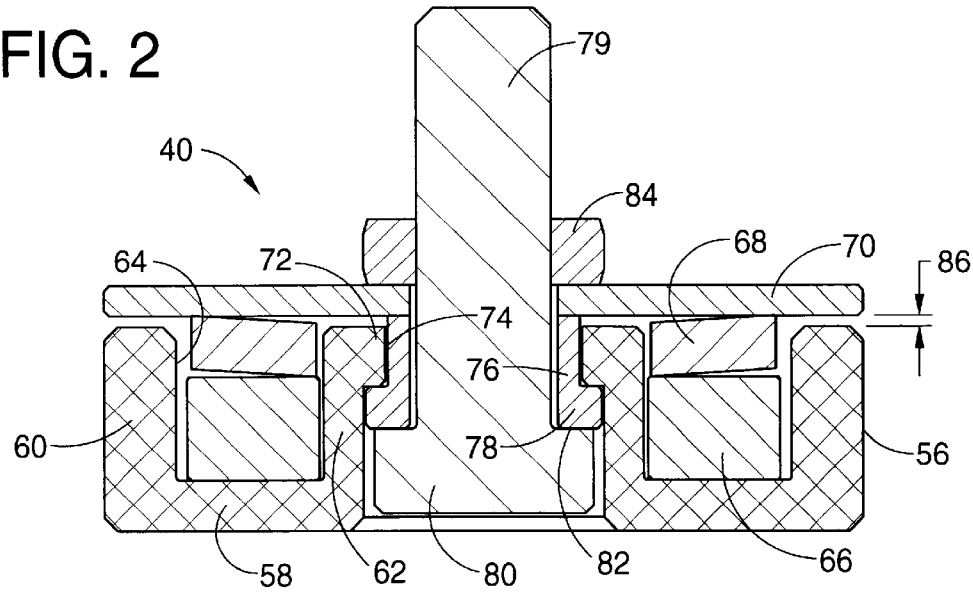
FIG. 2 is an enlarged, longitudinal cross-sectional view of a manifold support in accordance with the present invention.

Referring now to FIG. 2, there is shown in enlarged form, and in longitudinal cross section, a manifold support 40 in accordance with the present invention. The support 40 includes an annular housing 56 that is defined by an annular base wall 58 that transitions to a longitudinally-extending outer wall 60 and a longitudinally-extending inner wall 62 spaced inwardly from the outer wall 60. The base wall 58, inner wall 62 and outer wall 60 thus define an annular, U-shaped channel 64. An annular washer 66 is positioned within the channel 64, and rests against the inner surface of the base wall 58 to provide a wear surface for a spring 68 that overlies the washer 66, as will be more fully explained later.

The spring 68 can be a Belleville washer, as shown, a coil spring, or any other elastic, annular ring that can maintain its resiliency when subjected to the higher than ambient temperatures encountered by the manifold support 40. The ensuing discussion will be based upon the use of springs in the form of Belleville washers, but it will be understood by those skilled in the art that other types of springs can also be utilized. A cover 70 in the form of an annular disk is provided to overlie annular channel 64 and to engage and retain the Belleville washer 68 carried within the channel 64.

The inner wall 62 includes an inwardly-extending flange 72 adjacent the open end of the annular channel 64. The flange 72 defines a through-bore 74 that slidably receives a tubular sleeve 76 having an outwardly extending flange 78 at one end. The flange 78 of the sleeve 76 and the flange 72 of the housing 56 are adapted to engage each other and thereby limit movement of the sleeve 76 relative to the housing 56. The end of the sleeve 76 opposite from the flange 78 contacts the cover 70 to space it from the flange 72 of the housing 56 when the flanges 72 and 76 are in contact with each other. A screw 79 extends through the interior of the sleeve 76 so that the screw head 80 engages an end surface 82 of the sleeve 76. A jam nut 84 is threaded on the screw 79 to hold together the several parts of the support 40 in the relative positions as shown in FIG. 2. More particularly, the nut 84 is hand-tightened so that the cover 70, sleeve 76 and screw head 80 into "metal-to metal" contact; the elements of the support 40 are sized such that the cover 70 will just come into contact with the spring 68 (no compression) when assembled in this manner.

Figure 3:
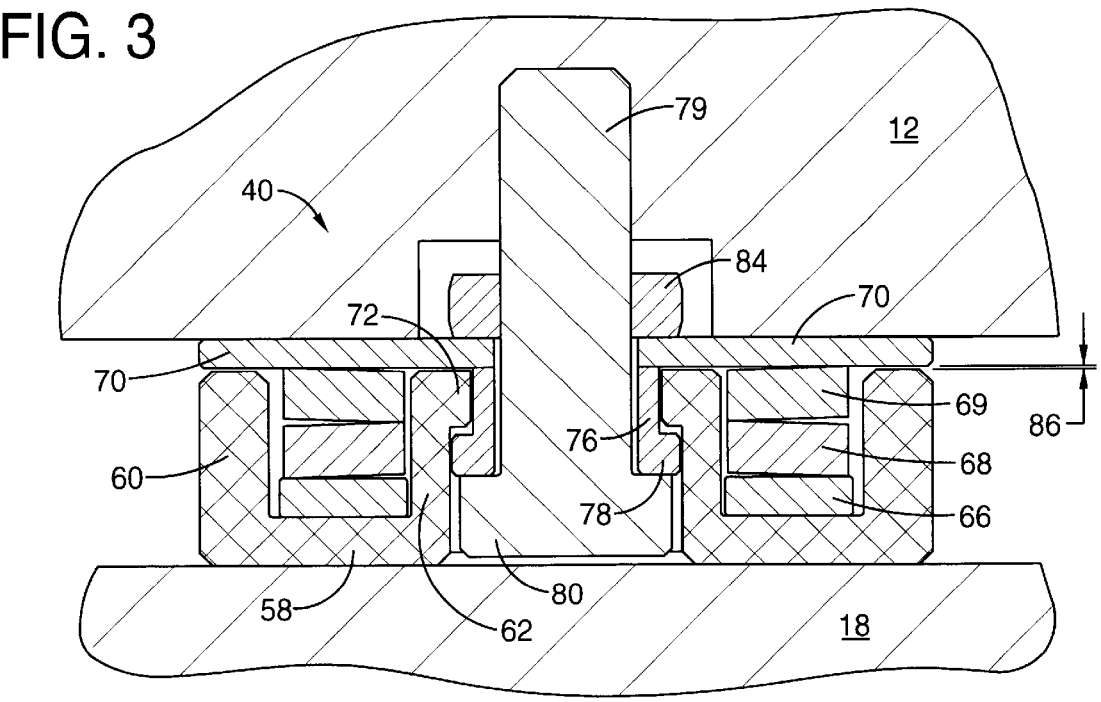
FIG. 3 is an enlarged, fragmentary longitudinal cross-sectional view of an alternate embodiment of a manifold support in accordance with the present invention and shown in its operative position while the parts of the mold are in a cold, start-up condition.
Figure 4:
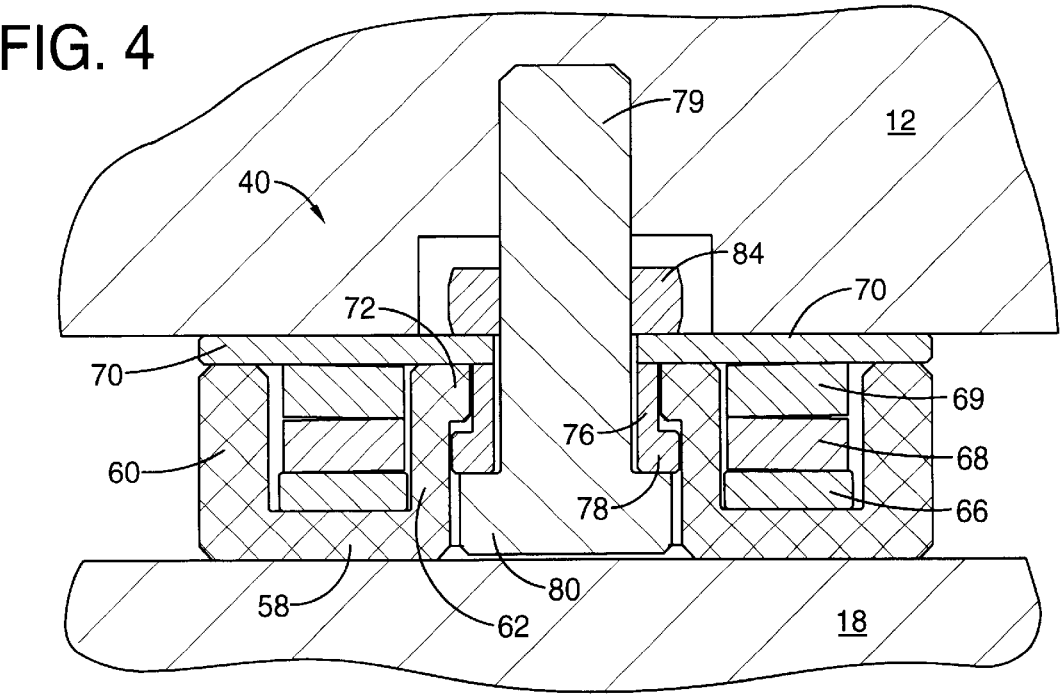
FIG. 4 is an enlarged, fragmentary longitudinal cross-sectional view similar to that of FIG. 3, but showing the respective mold parts at a point shortly before the mold reaches its normal operating temperature.

As can also be seen in FIG. 2, when in its assembled form and without any axial load imposed, the support 40 includes a gap 86 between the cover 70 and the annular housing 56. Thus, when the support 40 is used in a mold assembly as shown in FIG. 1 and an axial compressive load is applied to the support 40, the housing 56 will move toward the cover 70, compressing the spring 68. When the compressive load is sufficient to force the opposed surfaces of the cover 70 and housing 56 to move into contact with each other, no further compression of the spring 68 can occur and the support 40 consequently acts as a solid, non-resilient spacer. The size of the initial gap 86 when not under load can be varied by changing the axial dimensions of the several parts of support 40, particularly the length of the sleeve 76. The resistance of the support 40 to compressive loads can be varied by changing the spring constant for the spring 68. Further, although shown in FIG. 2 as having a single spring 68, two or more such springs can be utilized, if desired. FIGS. 3 and 4 show a configuration for the support 40 in which the spring force is provided by two back-to-back Belleville washers.

Additionally, although other forms of annular springs can be employed in the support 40, Belleville washers are preferred because they provide the desired spring constant and have a low axial height, thereby occupying less space in the mold assembly. However, when a Belleville washer flexes or deflects with changes in the magnitude of the compressive force, the inner and outer edges of the Belleville washer move slightly in a radial direction, thereby tending to scuff the supporting surfaces; in this case, the washer 66 and cover 70 are in contact with the spring 68. Accordingly, both the washer 66 and cover 70 are preferably surface hardened to prevent wear that can occur from movement of the Belleville washer over the contacting surfaces. In that regard, the washer 66 and cover 70 can have a surface hardness that exceeds the hardness of the interposed Belleville washer(s). Further, the annular housing 56 is preferably formed from a material that can withstand relatively high temperatures, of the order from about 400° C. to about 500° C., and that can also withstand the compressive loads to which it can be subjected when in use. A suitable material for the annular housing 56 is titanium alloy, such as Ti-6Al-4V, which is widely available.

The manner of use for the support 40 can best be seen in FIGS. 3 and 4. In each of FIGS. 3 and 4 the support 40 is positioned between the top clamp plate 12 and manifold block 18 and includes two back-to-back Belleville washers 68 and 69. FIG. 3 shows the respective parts of the system when they are in their "cold" condition, at start-up of the molding machine before the mold elements have reached their operating temperature. When in this condition, the support 40 is at least partially compressed to transmit a "preload" force to the manifold 18, thereby maintaining a sealed relationship between the flow nozzle 20 and the manifold 18, as shown in FIG. 1. The gap 86 between the annular housing 56 and the cover 70 allows limited relative movement between those parts and a corresponding increase in force. In the unloaded state (before assembly in the mold), the gap 86 can be of the order of about 0.015 in. (FIG. 2); the gap 86 is preferably reduced to about 0.007 in. when the mold is fully assembled in the "cold" state with the preload applied (FIG. 3), as described above. When the manifold block 18 is heated it expands, causing the annular housing 56 and cover 70 of the support 40 to move together, thereby reducing the size of gap 86 and increasing the compressive force as the manifold expands with increasing temperature.

At a time shortly before the respective parts of the injection mold reach normal operating temperatures, the size of gap 86 is reduced to zero, so that there is direct metal-to-metal contact between the annular housing 56 and cover 70, as shown in FIG. 4. The narrowing of the space between the top clamp plate 12 and manifold block 18 with increasing temperature has at least partially compressed springs 68 and 69, and has caused the annular housing 56 of the support 40 to contact the cover 70. Further thermal expansion of the manifold block 18 serves to compress all of the elements of the support 40 and increase the force tending to hold injection nozzle 20 (see FIG. 1) in tight contact with manifold block 18. Thus, leakage of molten molding material through gaps between the respective parts that define the flow passageway is avoided.

Because direct, metal-to-metal contact occurs in the support 40 at a time shortly before the mold reaches its normal operating temperature, should spring failure occur, or should excessive spring relaxation occur due to temperature, the direct, metal-to-metal contact between the manifold block 18, support 40, and clamp plate 12 will prevent any such spring failure from allowing leakage of molding material. In the prior art arrangements, on the other hand, spring tension has to be maintained throughout the operation of the machine, from cold start-up through and including normal operating temperature; consequently, reliance was placed upon the springs to maintain the parts in liquid-tight relationship at all times. As will be appreciated, at normal operating conditions the present invention provides a more positive seal between the respective contacting parts defining the material flow passageway, one that is independent of the spring force and even of the spring condition.

As is apparent from FIGS. 2 and 3, the amount of preload that is applied to the spring 68 is determined by the spring constant and the amount the spring 68 is compressed when the support 40 is initially assembled into the hot runner system of an injection mold ("cold" condition). The support 40 is secured to the top clamp plate 12 by the screw 79, as shown in FIG. 3, and compressed slightly to apply the preload when the top clamp plate 12 is attached to the nozzle retainer plate 14. Depending on the size and shape of the hot runner manifold block 18, as well as the total number of nozzles 20, several supports 40 are used to apply a uniform force and maintain contact between the manifold block 18 and nozzles 20.

Although particular embodiments of the present invention have been illustrated and described, it would be apparent to those skilled in the art that various changes and modifications can be made without departing from the concepts of the present invention. Accordingly, it is intended to encompass within the appended claims all such changes and modifications that fall within the scope of the invention as described herein.

What is claimed is:

1. A method for maintaining in liquid-tight relationship among a plurality of metallic mold elements that undergo different rates of thermal expansion over a temperature range from an ambient, pre-startup temperature to an elevated operating temperature, comprising the steps of:

positioning a support member between certain mold elements to apply compressive force, the support member including a spring in a housing, the spring acting to separate the mold elements by a defined gap when the mold elements are at the pre-startup temperature;

applying a first compressive force by means of the spring in the support member, wherein the first compressive force increases as the mold elements expand with increasing temperature for a first portion of the temperature range from the pre-startup temperature to a temperature less than the operating temperature; and applying a second compressive force for a second portion of the temperature range after thermal expansion of the mold elements has compressed the spring to close the gap, resulting in direct metal-to-metal contact between the mold elements and the support member prior to the mold elements reaching operating temperature, wherein the second compressive force is greater than the first compressive force and is created primarily by continued thermal expansion of the mold elements after metal-to-metal contact is achieved.

* * * * *